United States Patent [19]

Calmettes et al.

[11] Patent Number: 4,742,600
[45] Date of Patent: May 10, 1988

[54] BAND CLAMP

[75] Inventors: Lionel Calmettes; Michel Àndre, both of Romorantin, France

[73] Assignee: Etablissements Caillau, Issy-les-Moulineaux, France

[21] Appl. No.: 13,237

[22] Filed: Feb. 10, 1987

[30] Foreign Application Priority Data

Feb. 25, 1986 [FR] France .................................. 86 02591
May 9, 1986 [FR] France .................................. 86 06716

[51] Int. Cl.⁴ .............................................. B65D 63/02
[52] U.S. Cl. ................... 24/20 R; 24/20 CW; 24/20 EE
[58] Field of Search ............ 24/20 R, 20 EE, 20 CW, 24/20 S, 20 W, 23 EE, 25, 16 R

[56] References Cited

U.S. PATENT DOCUMENTS

| 487,145 | 11/1892 | Gibbons | 24/20 EE |
|---|---|---|---|
| 1,559,049 | 10/1925 | Rutledge . | |
| 1,687,854 | 10/1928 | Anderson | 24/20 EE |
| 1,942,600 | 9/1932 | Hornung . | |
| 2,646,940 | 7/1953 | Volz | 24/20 EE |
| 2,947,055 | 8/1960 | McHenry | 24/20 EE |
| 3,300,805 | 1/1967 | Rizzo | 24/16 R |
| 3,898,713 | 8/1975 | Nelson et al. . | |
| 4,275,484 | 6/1981 | Irio et al. | 24/20 R |
| 4,492,004 | 1/1985 | Oetiker | 24/20 R |
| 4,517,708 | 5/1985 | Calmettes et al. | 24/20 CW |
| 4,622,720 | 11/1986 | Oetiker | 24/20 EE |

FOREIGN PATENT DOCUMENTS

| 0079252 | 9/1982 | European Pat. Off. . | |
|---|---|---|---|
| 2523260 | 6/1982 | France . | |
| 932116 | 7/1963 | United Kingdom | 24/20 EE |

Primary Examiner—Victor N. Sakran
Attorney, Agent, or Firm—Lewis H. Eslinger

[57] ABSTRACT

A clamp constituted by a band of metal wound over itself and comprising at one of its end, called outer end, and close to the other end, called inner end, complementary fastening means, the metal band being extended, beyond the fastening means situated at the inner end, by a part which, in the unfastened position of the clamp, spreads between the two fastening means, clamp wherein the inner end of the band ends into a bent-up part, generally shaped as an outwardly directed T, whereas the outer end is provided, at the back of its fastening means, with a longitudinal slot of which the width is at least equal to that of the vertical bar of the T.

4 Claims, 3 Drawing Sheets

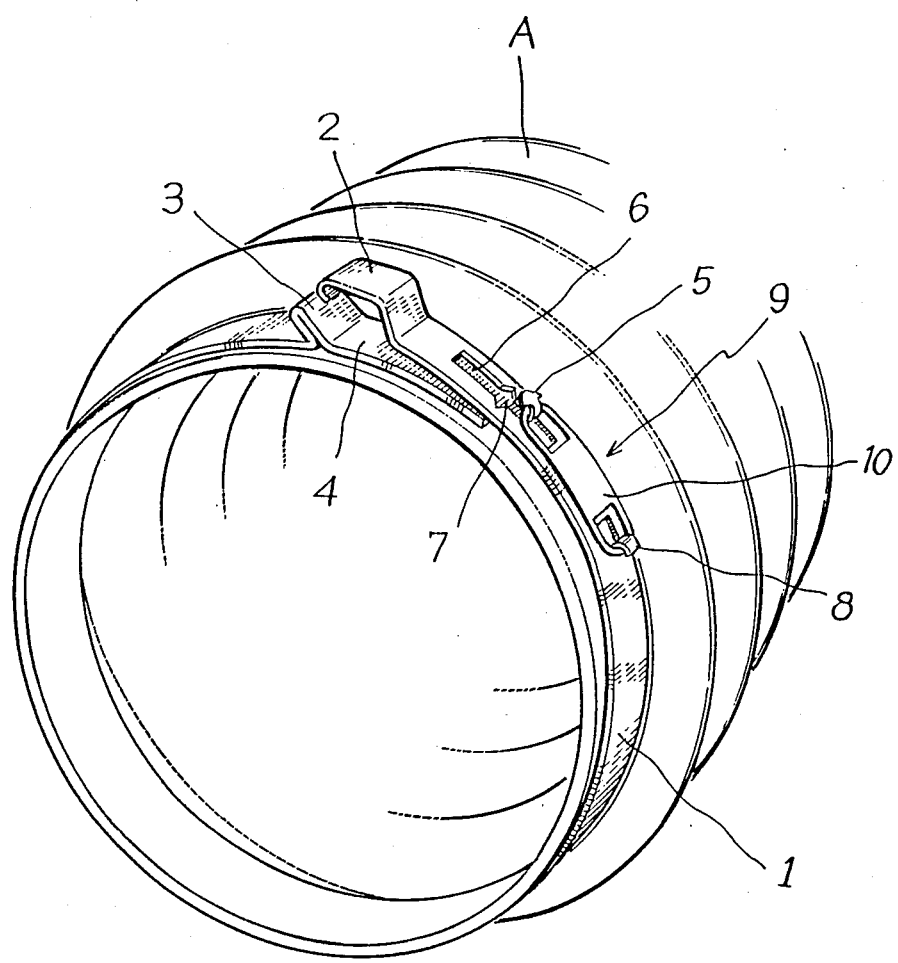

BAND CLAMP

A rather simple-designed clamp is known already, in particular from European Patent No. 3192, which clamp is constituted by a metal band wound over itself, its two ends partly overlapping, thus defining an inner end and an outer end.

Each end is provided with complementary clamping and fastening means, for tightening the clamp for example over a hose mounted on a rigid pipe. Preferably, the outer end of the band is constituted by a hook member which is designed to cooperate, after tightening of the clamp, with a lug piece situated close to the inner end of the band. The band is extended, beyond the fastening means situated close to the inner end, by a part which, in the loosened position of the clamp, extends between two fastening means.

Clamps of this type are very satisfactory, in that they are easy to produce, easy to fit and easy to fasten.

It is obviously an advantage to supply the clamps in their unfastened position, but then it is found, especially with clamps of large diameter, that they tangle up one with the other. The user then has to separate them, before being able to fit them, which represents a waste of time.

It is the object of the present invention to overcome this disadvantage, while improving the reliability of the fitting, of the clamping and of the fastening of the two ends of the clamp.

According to the invention, the inner end of the band constituting the clamp, ends into a radial bent-up part, generally T-shaped, whereas the outer end comprises, behind the fastening means provided thereon, a longitudinal slot the width of which is at least equal to that of the vertical bar of the T.

Thus, when the clamp is not fastened up, there is no gap in its periphery, this avoiding the risk referred to hereinabove. Moreover, as explained hereinafter, the reliability of the positioning is improved.

It is also more advantageous, when fitting and mounting a flexible hose on a rigid pipe or like member, if, before clamping it with a band clamp, said band clamp is already in position on the hose. Obviously, in this case, the clamp must not be fastened up before the hose is mounted, but it must be fitted firmly enough to allow manipulation of the hose without any risk of both elements separating.

The clamp, having the aforesaid characteristic, can, in certain cases, be suitable for the aforesaid purpose, but this will require relatively fine tolerances of the external diameter of the hose and of the internal diameter of the clamp, in its unfastened position. Such conditions, although theoretically possible, are difficult to obtain with mass-production, as is the case in particular in the motorcar industry, where robotization of the assembly lines is fast spreading.

Consequently, the clamp will be advantageously provided with means permitting the ready fitting thereof on a hose or like member, while keeping a firm hold on said fitting throughout the manipulations of the hose, before the clamp is tightly fastened.

To this effect, the clamp according to the invention comprises, beyond the end of the longitudinal slot opposite the fastening means provided at the outer end of the band, a hook formed in the band and directed outwardly, whereas an elastic member, such as for example a rubber band or the like, is attached, first to said hook, and then to the radial bent-up part of the inner end of the band.

With these dispositions, the elastic member cannot prevent the necessary increase of the inner diameter of the clamp when said clamp is being fitted over the hose, but it causes the subsequent tightening up of the clamp on the hose which is necessary to hold it there, without actually interfering with the subsequent positioning of the hose on the member waiting to receive it.

The invention will be more readily understood on reading the following description with reference to the accompanying drawings, in which:

FIG. 5 is a perspective view of a variant embodiment of the clamp according to the invention, in unfastened position.

Figure 1:
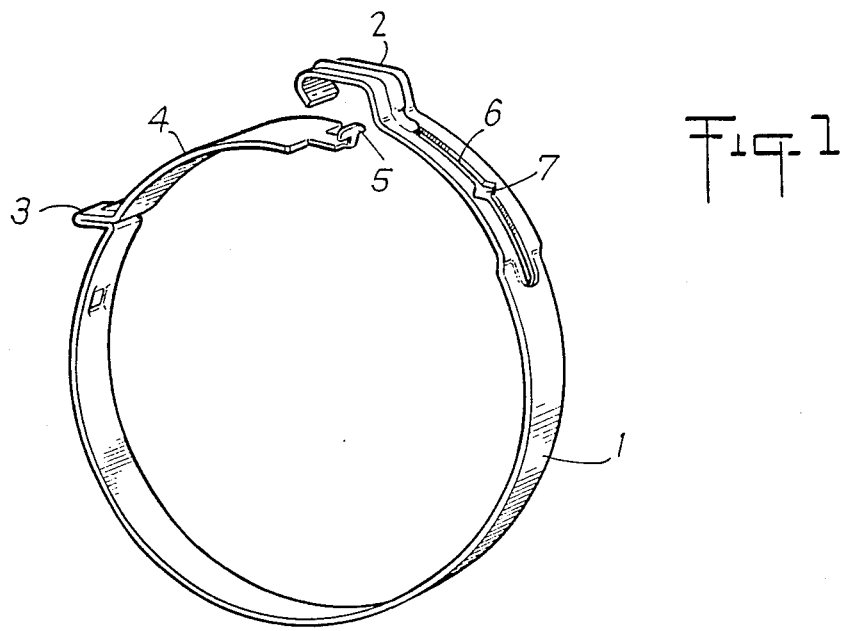
FIG. 1 is a perspective view of the band clamp according to the invention, in open position.
Figure 2:
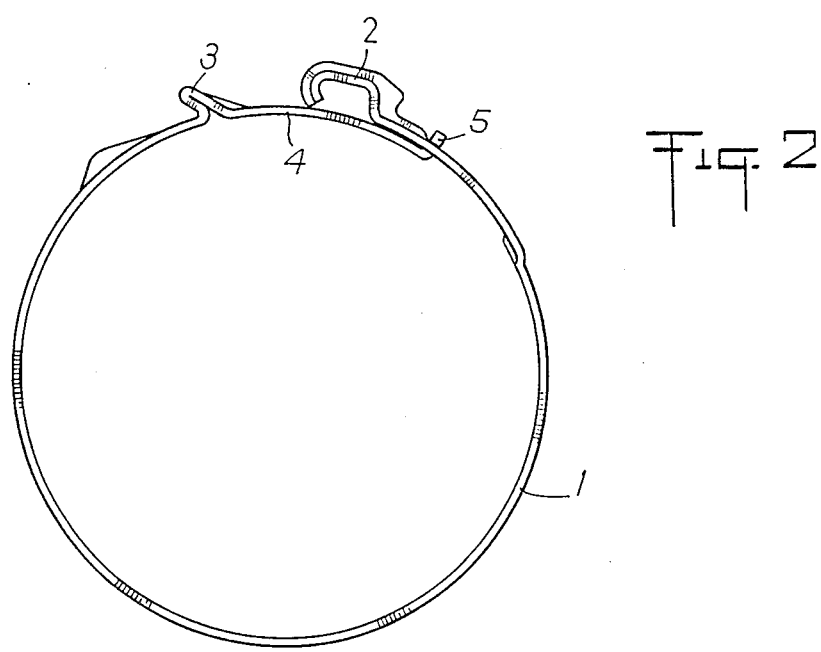
FIG. 2 is a profile view of the clamp in closed position, but unfastened.

Referring now to the drawings, these show a clamp of the type described in the above-referred European Patent. The metal band 1 is wound over itself and its outer end comprises a hook 2 designed to fasten up on a lug piece 3 provided close to the inner end. Beyond said lug piece 3, the band 1 is extended by a part 4 which, as illustrated in FIG. 1 and particularly in FIG. 2, spreads between the lug piece 3 and the hook 2.

Figure 3:
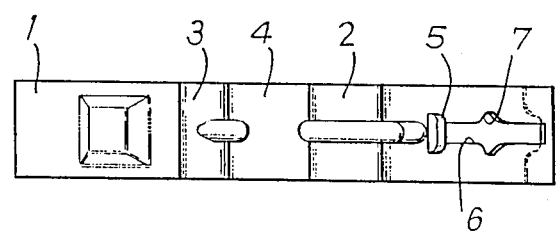
FIG. 3 is a plan view of the clamp shown in FIG. 2.
Figure 4:
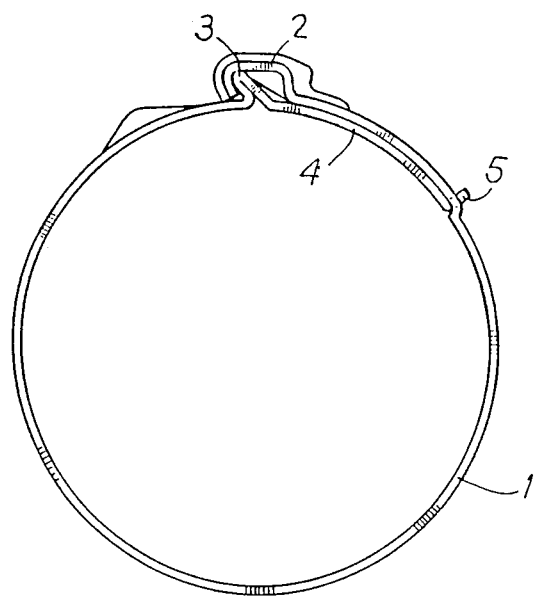
FIG. 4 is a profile view of the clamp in fastened position.

The extension 4 ends, on the side opposite the lug piece 3, into a generally radial bent-up part 5, cut in the shape of a T and bent outwardly, the horizontal bar of the T being substantially transversal with respect to the plane of symmetry of the clamp. At the back of the hook 2, the outer end of the band comprises a longitudinal slot 6, which is clearly shown in FIG. 3. The width of said slot is at least equal to that of the vertical bar of the T-shaped radial bent-up part 5 which, as explained hereinafter, is designed to engage therein. The length of slot 6 should be sufficient to allow the fastening of hook 2 on lug piece 3.

Slot 6 and the vertical bar of radial T-shaped bent-up part 5 are, preferably situated in the plane of symmetry of the clamp.

To allow the ready closure of the clamp, before tightening, a hole 7 is advantageously provided in one part of slot 6 away from the hook 2, the transversal dimension of which hole is at least equal to the length of the horizontal bar of the T.

It will be pointed here that by "T-shape" is essentially meant a bent profile, such as for example that formed by the capital Greek letter "gamma" ($\gamma$).

The clamp according to the invention is generally produced by rolling a metal band, the cutting or bending operations necessary to produce the afore-described elements being performed before or after the rolling operation. The last step in the production consists in bringing the radial bent-up part 5 opposite the hole 7 and in introducing therein the horizontal bar of the T. When the clamp is released, the elasticity of the metal brings the bent-up part 5 in abutment against the end of the slot 6, close to the hook 2.

The clamp can thus be supplied in large quantities in its closed position (FIG. 2) without any risk of the clamps clustering up. After mounting the clamp on the hose or part to be clamped, generally by sliding it over, the hook 2 is brought close to the lug piece 3 by using a suitable tool such as pliers, until fastening occurs. During this operation, the vertical bar of the bent-up part 5 is pushed back inside the slot which, accessorly, serves as a guide therefor, as far as the end of said slot, away from the hook 2.

If in certain cases, the clamp cannot be mounted by sliding over the part to be clamped, said clamp can easily be opened by bringing the bent-up part 5 opposite the hole 7 and by bringing it out of said hole. Once the clamp is mounted, the operation is reversed, and tightening is performed as indicated hereinabove.

Referring now to FIG. 5, this shows a clamp of the type described in the foregoing, the elements already bearing the same reference numerals.

It should however be noted that, beyond the end of the longitudinal slot 6, opposite the clamp fastening means 2, the band 1 is provided with a hook 8, facing outwardly from the clamp.

Elastic means bearing the general reference number 9 are coupled, on the one hand, to the hook 8, and on the other hand, to the bent-up part 5 provided on the inner end 4 of the band. Said member 9 can take on various shapes, such as that of a spring or of a simple flat rubber strip 10 having a hole at each end. This is precisely the configuration which is illustrated in the figure, the hook 8 and the bent-up part 5 being introduced in the holes of the band. A rubber ring could also be used, the end loops of which ring would then be engaged on the hook 8 and on the bent-up part 5.

With said elastic means 9, the hook 8 and bent-up part 5 are urged one towards the other. The dimensions of the elastic means and their return force are such that the fastening means 2 and 3 are normally held close together, despite the natural tendency of the clamp to adopt the position illustrated in FIG. 2.

The fitting of an improved clamp over a flexible hose, such as for example, the end of protective bellows A used for protecting articulated joints (Cardan joints) in a vehicle transmission, is easy. It is sufficient to increase somewhat the inner diameter of the clamp against the return force exerted by elastic means 9. When the clamp is fitted as illustrated in the figure, the return force exerted by elastic means 9 is sufficient to hold the clamp in position during the manipulations of the bellows, without however impeding the fitting operation on the pipe or rigid member designed to receive it. Tightening of the clamp is then performed as described hereinabove and is maintained by the engagement of the fastening means 2 over the lug piece 3.

The invention finds a particularly advantageous application in industries such as the motorcar industry, where large numbers of clamps are used and where a fast rate of assembly must be kept up.

What is claimed is:

1. A clamp constituted by a band of metal wound over itself and comprising at one of its ends, called an outer end, and in spaced-apart relationship from the other end, called an inner end, complementary fastening means, the metal band extending beyond the fastening means situated at the inner end by a part which, in an unfastened position of the clamp, extends between the two fastening means, wherein the inner end of the band ends into a bent-up part generally shaped as an outwardly directed T, whereas the outer end is provided at the back of its fastening means with a longitudinal slot of which the width is at least equal to that of the vertical bar of the T and the length of said longitudinal slot is sufficient to permit said complementary fastening means to be mutually fastened when said bent-up part is engaged in said slot.

2. A clamp as claimed in claim 1, wherein the vertical bar of said T-shaped bent-up part is situated in the plane of symmetry of the clamp.

3. A clamp as claimed in claim 1, wherein the longitudinal slot comprises, in an area distant from the fastening means of the outer end of the clamp, a hole whose transversal dimension is at least equal to the length of the horizontal bar of the radial T-shaped bent-up part.

4. A clamp as claimed in claim 1, wherein beyond the end of said longitudinal slot, opposite the fastening means provided on the outer end of the clamp, said latter comprises an outwardly directed hook, whereas elastic means such as for example a rubber band or the like, are coupled, on the one hand, to said hook, and on the other hand, to the radial bent-up part of the inner end of the band.

* * * * *